Aug. 21, 1923. 1,465,584
O. McCULLOUGH ET AL
ELECTRIC BRAKE
Filed Nov. 9, 1922

WITNESSES
J. Herbert Bradley

INVENTOR
D. E. Brown
O. McCullough
by Green & McCallister
their attorneys in fact.

Patented Aug. 21, 1923.

1,465,584

UNITED STATES PATENT OFFICE.

OSWELL McCULLOUGH AND DEWEES E. BROWN, OF DONORA, PENNSYLVANIA.

ELECTRIC BRAKE.

Application filed November 9, 1922. Serial No. 599,866.

*To all whom it may concern:*

Be it known that we, OSWELL MCCULLOUGH and DEWEES E. BROWN, citizens of the United States, and residents of Donora, in the county of Washington and State of Pennsylvania, have made a new and useful Improvement in Electric Brakes, of which the following is a specification.

This invention relates to electric brakes for automobiles and similar vehicles, and has for an object to produce a simple and effective brake which may be employed in connection with the driving mechanism, driving wheels or other wheels of a vehicle for the purpose of retarding the speed of the vehicle.

A further object is to produce a brake for vehicles which is of simple construction, is capable of effectively and quickly reducing the speed of the vehicle, but which will prevent sliding of the vehicle wheels.

A further object is to produce an electric brake for vehicles in which there are no sliding parts and in which means are employed for varying the effective retarding force of the vehicle or for maintaining the retarding forces substantially constant.

These and other objects are attained by means of apparatus embodying features herein described and illustrated in drawings accompanying and forming a part hereof.

Figure 1:
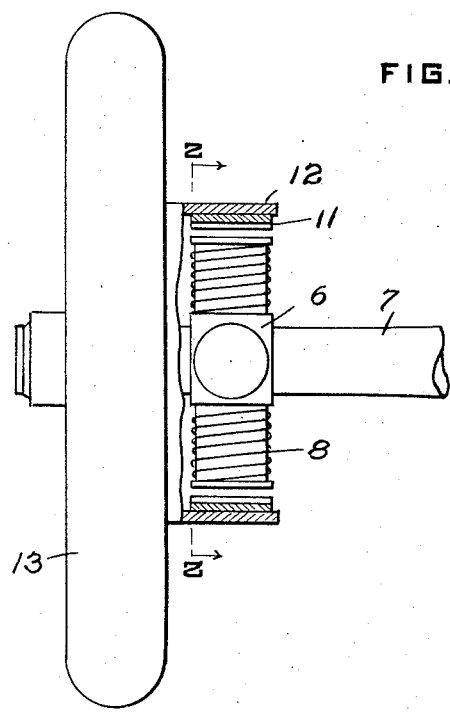
Figure 4:
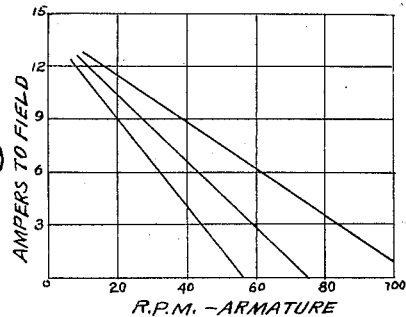
Figure 2:
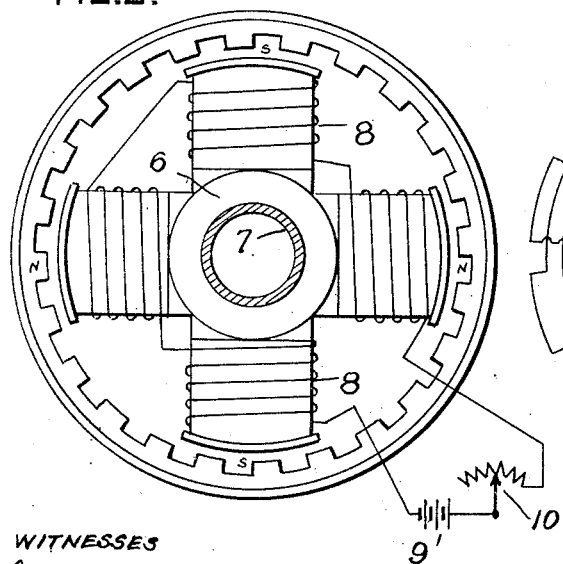
Figure 3:
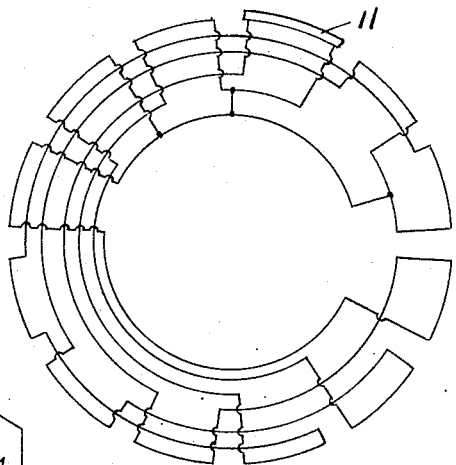

In the drawings, Figure 1 is a diagrammatic view of apparatus embodying our invention applied to an automobile wheel; the embodiment of the invention is shown partially in section for convenience of illustration. Fig. 2 is a diagrammatic sectional view along the line 2—2 of Fig. 1; in connection with a wiring diagram. Fig. 3 is a diagram of a short circuited armature forming a detail of our invention. Fig. 4 is a graph disclosing the effectiveness of the brake under varying conditions of speed and field saturation.

In the drawings we have illustrated our invention as applied to the wheel of an automobile. It will, however, be understood that the rotating element of the brake may be applied to any portion of the running gear of the vehicle or that it may be operatively coupled to the running gear by means of a train of power transmitting elements such as a gear train.

Our invention consists in employing means whereby the rotation of the wheels or other parts of the running gear of the automobile may be caused to do work by generating electricity, and thereby imposing a retarding force on the running gear. Our invention also contemplates the production of simple and effective means for controlling the degree of the retarding force by varying the amount of electrical energy generated under the various speed conditions encountered during the operation of braking or retarding the vehicle.

As illustrated in Fig. 1, the vehicle is equipped with an electric generator so arranged that the stator is rigidly mounted on the frame of the vehicle and the rotor is mounted on a rotating part of the running gear. As illustrated, the rotor consists of a short circuited armature which is associated with one or more electromagnets which comprise the stator element. As shown in the drawings, the stator consists of a four pole field in which the coils of the different poles are in series and so arranged that the adjacent poles are of opposite polarity. The rotor element may be of usual form of armature except that it is short circuited and is preferably so constructed that it may be overloaded for an appreciable period of time without danger of burning out.

As shown in the drawings, the stator element comprises four pole pieces 6 which are rigidly mounted on the axle housing 7 of an automobile. Each pole piece is provided with the usual energizing coil 8 and the coils are connected in series as illustrated in Fig. 2. Exciting current is delivered to the field coils from any source, such for example, as the storage battery 9 of the vehicle and the magnetic saturation of the field is controlled by means of a rheostat 10 which may be located convenient to the hand of the driver,—for example, on the dash of the vehicle.

The armature coils 11 are of the usual form, but as shown, are mounted on a ring or annulus 12 secured to the wheel 13 of the automobile and forming in effect a housing for the electric brake. In Fig. 3, we have illustrated one form of wiring which may be employed in connection with the armature coils 11. It will of course be understood that the armature may be mounted on a non-rotating part of the vehicle and that the field may be mounted on a rotating part of the vehicle. We, however, find it desirable to control the operation of the brake by varying the intensity of the magnetic field from zero to maximum saturation and this is most easily accomplished, from the standpoint of the structural details, by mounting the field windings on a non-rotating part of the frame. With this arrangement, the excitation current can be varied without necessity of employing slip rings or a commutator and consequently the construction of the brake is relatively simple and cheap to manufacture, and there is little likelihood of deterioration in use.

An advantage of the invention is that the vehicle can be quickly retarded without subjecting the frame to undue strain and without the danger of sliding the wheels. In applying the braking forces, excitation current is delivered to the field windings with a resultant retarding effect which is determined by the amount of electrical energy in the short circuited armature circuit, and this in turn depends on the degree of magnetic saturation of the field and the speed of rotation of the armature or the speed of the vehicle. A reference to Fig. 4 discloses the fact that by delivering a current of one ampere to the field windings of a generator of selected design, a retarding force of 20 H. P. immediately results if the armature is rotating at 100 revolutions per minute It will of course be apparent that as soon as this retarding force is applied to the vehicle, the speed of the vehicle will decrease, provided the impelling force remain constant, and consequently the speed of revolution of the armature will decrease. The effective retarding force can however be maintained constant or substantially constant by increasing the amperage of the current delivered to the field windings as the speed of the vehicle decreases. For example, a reference to Fig. 4 indicates that as the speed decreases from a hundred R. P. M. to about 5 R. P. M., the retarding forces exerted by the brake may be maintained constant by increasing the amperage of the excitation current from one ampere up to thirteen and a fraction amperes. It will of course be apparent that the retarding force may be so applied that the speed of a vehicle can be maintained uniform as long as the impelling force is maintained uniform. For example, the rheostat associated with the field windings of the electric brake may be set so that the vehicle will not exceed a determined speed while coasting down a long hill, and the speed of the vehicle will then be maintained constant so long as the road conditions remain constant. This will be apparent when it is understood that the retarding force occasioned by the brake decreases as the speed decreases; consequently, if the road conditions are such as to cause the vehicle to move down a hill at a fixed speed, when the vehicle is subjected to a determined retarding force of, for example, 5 H. P., the retarding forces diminish as the speed diminishes, unless the amperage in the excitation circuit is increased; consequently, where the excitation current is maintained constant, the retarding forces will only remain constant so long as the armature rotates at a predetermined speed and any decrease in this speed of rotation will occasion a decrease in the retarding forces, thereby permitting the vehicle to accelerate until the determined speed is attained.

It will also be apparent that even though the amperage of the excitation is increased as the speed decreases, the wheels of the vehicle can not be held stationary, and consequently, can not slide, since as soon as the armature ceases to rotate, the electric brake mechanism ceases to develop current and therefore ceases to occasion a retarding action.

In experimenting with apparatus embodying our invention, we have found that the speed of a vehicle can be quickly reduced from any reasonable speed to a speed at which the vehicle wheels make approximately 5 revolutions per minute, but that the brake is automatically rendered ineffective when a speed less than this is attained.

Another advantage of our invention is its flexibility of application. The braking mechanism may be associated with any rotating element of the running gear or a separate braking mechanism may be applied to each wheel of the vehicle, and at the same time, all four mechanisms will respond to the control of a single rheostat and will apply an equal retarding force to each wheel. This is exceedingly desirable since it reduces the strains and wear on the driving wheels and ensures more effective control of the vehicle.

While we have illustrated and described but one embodiment of our invention, it will be apparent that various changes, modifications, additions and substitutions may be made in the apparatus described without departing from the spirit and scope of the invention herein set forth.

What we claim as our invention is:—

1. In combination with the frame and running gear of a vehicle, an electric generator having its rotor element operatively coupled to a rotating element of the running gear, and its stator element mounted on a non-rotating part of the frame, manually controlled means for varying the current output of the generator and thereby varying the retarding effect on the running gear.

2. In combination with the frame and running gear of a vehicle, an electric generator, having its rotor element operatively coupled to the running gear of the vehicle, and its stator element mounted on the frame of the vehicle, means short circuiting the armature of the generator, and manually controlled means for varying the effective magnetic field of the generator to vary the retarding effect on the running gear.

3. In combination with the frame and running gear of a vehicle, an electric generator, comprising a short circuited rotating armature operatively coupled to a rotating element of the running gear, a field winding mounted on the frame and manually controlled means for varying the magnetic saturation of the field to vary the retarding effect on the running gear.

4. In combination with the frame and a driving wheel of a vehicle, a brake housing secured to the wheel, a short circuited rotating armature secured to the brake housing, a stationary field associated with the armature and mounted on the frame of the vehicle, and manually controlled means for varying the intensity of the magnetic field and the retarding force on said wheel.

5. In combination with the frame and a driving wheel of a vehicle, a brake housing secured to the wheel, a short circuited armature enclosed by and mounted on the housing, an electromagnetic field associated with said armature and mounted on the frame, and means for varying the current through the coils of said field to vary the induced magnetic field.

In testimony whereof, we have hereunto subscribed our names this 7th day of November, 1922.

OSWELL McCULLOUGH.
DEWEES E. BROWN.